(12) United States Patent
Heitfield

(10) Patent No.: US 11,642,580 B2
(45) Date of Patent: May 9, 2023

(54) SAND TRAP RAKE FOR USE ON GOLF COURSES

(71) Applicant: John E. Heitfield, Greenville, OH (US)

(72) Inventor: John E. Heitfield, Greenville, OH (US)

(73) Assignee: John E. Heitfield, Greenville, OH (US)

( * ) Notice: Subject to any disclaimer, the term of this patent is extended or adjusted under 35 U.S.C. 154(b) by 353 days.

(21) Appl. No.: 16/985,754

(22) Filed: Aug. 5, 2020

(65) Prior Publication Data

US 2022/0040545 A1 Feb. 10, 2022

(51) Int. Cl.
*A01D 7/02* (2006.01)
*A01D 7/06* (2006.01)
*A63B 57/50* (2015.01)

(52) U.S. Cl.
CPC .............. *A63B 57/50* (2015.10); *A01D 7/02* (2013.01); *A01D 7/06* (2013.01)

(58) Field of Classification Search
CPC .......................... A01D 7/00–7/10; A63B 57/50
See application file for complete search history.

(56) References Cited

U.S. PATENT DOCUMENTS

| 1,422,090 | A | * | 7/1922 | Dickie | A01B 1/20 403/230 |
| 2,317,916 | A | * | 4/1943 | Kallal | A01D 7/06 56/400.01 |
| 2,400,241 | A | * | 5/1946 | Linden | A01B 1/06 172/375 |
| 6,761,021 | B1 | * | 7/2004 | Snyder | A01D 7/04 56/400.21 |
| 7,162,857 | B1 | * | 1/2007 | Gagne | A01D 7/10 56/400.07 |
| D560,451 | S | * | 1/2008 | Silicato | D8/13 |
| 2011/0042982 | A1 | * | 2/2011 | Coutu | A01B 1/20 294/51 |
| 2011/0067375 | A1 | * | 3/2011 | Madaffer | A01D 7/04 56/400.21 |
| 2019/0045696 | A1 | * | 2/2019 | Schoeppner | A01B 1/20 |
| 2019/0230849 | A1 | * | 8/2019 | Heitfield | A63B 57/50 |

FOREIGN PATENT DOCUMENTS

| DE | 29505599 | U1 | * | 7/1995 | |
| EP | 3336263 | A1 | * | 6/2018 | |
| FR | 2858914 | A1 | * | 2/2005 | ............... A01B 1/14 |
| GB | 932975 | A | * | 7/1963 | |
| KR | 20150107526 | A | * | 9/2015 | |
| KR | 101708022 | B1 | * | 2/2017 | |
| KR | 20170030928 | A | * | 3/2017 | |

* cited by examiner

*Primary Examiner* — Alicia Torres
*Assistant Examiner* — Madeline I Runco
(74) *Attorney, Agent, or Firm* — Dorton & Willis, LLP

(57) ABSTRACT

A sand trap rake for use on golf courses includes an elongate rake head having an elongate body member with a front end, a back end, and first and second lateral sides between the front and back ends. The rake head defines a raking direction aligned with a direction extending from the front end to the back end. A plurality of tines extend downwardly from the body member and are spaced apart along a longitudinal direction of the rake head, transverse to the raking direction. The rake further includes an elongate front blade extending downwardly from the front end of the body member, and an elongate rear blade extending downwardly from the back end of the body member. The rake may be used in one of four selectable raking modes to prepare a sand surface for golf play.

16 Claims, 7 Drawing Sheets

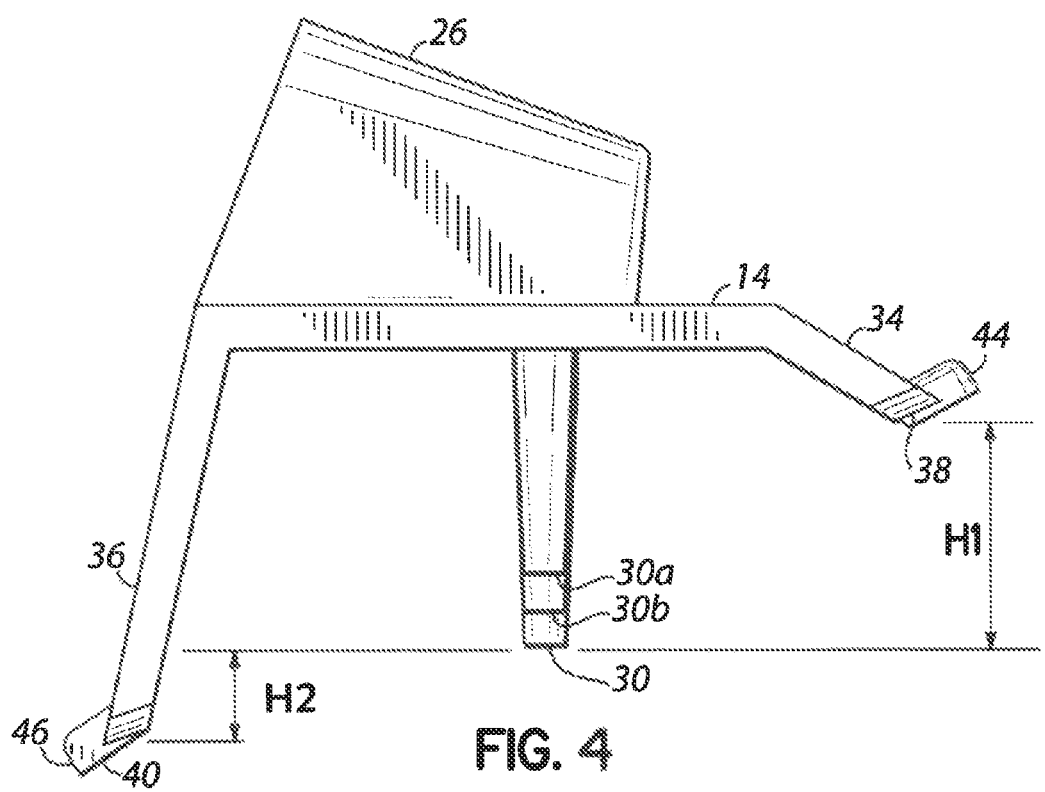

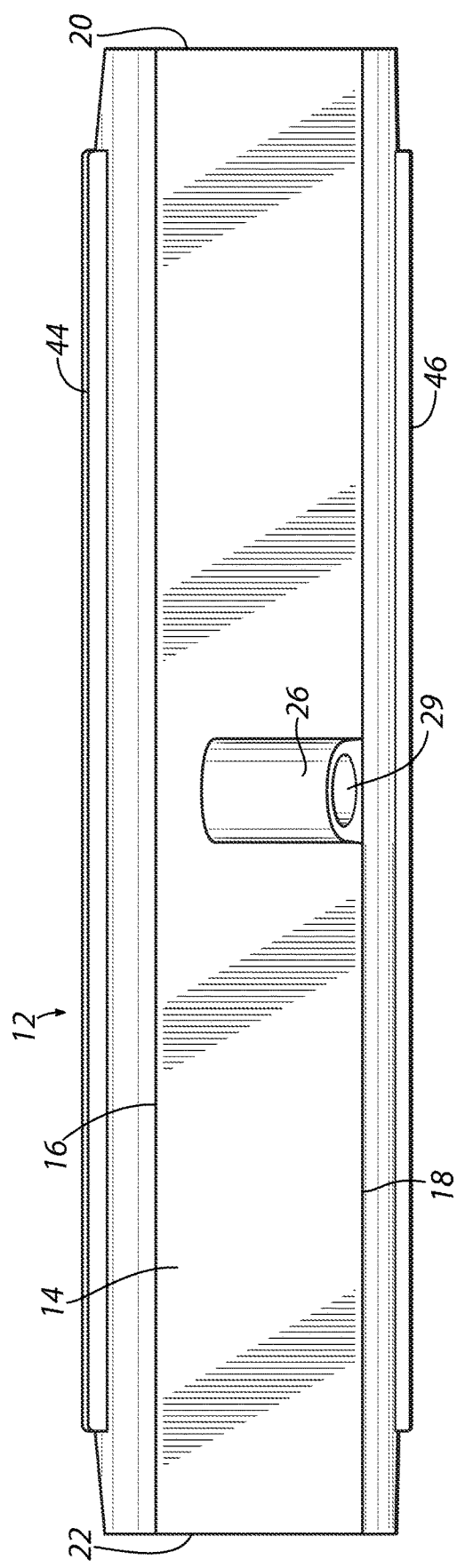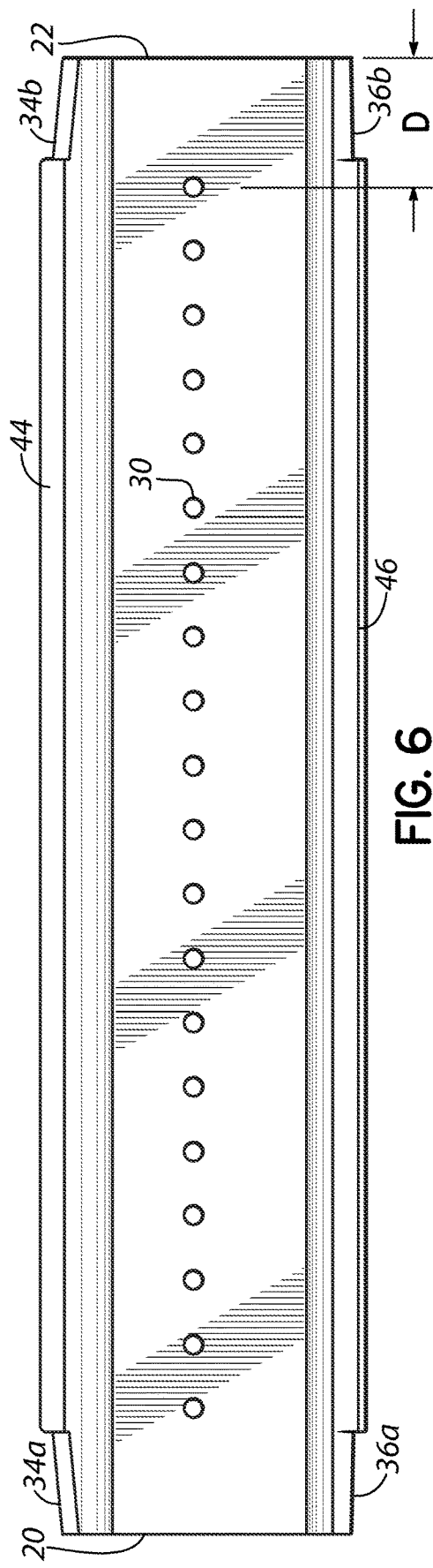

SAND TRAP RAKE FOR USE ON GOLF COURSES

TECHNICAL FIELD

The present invention relates generally to tools for treating a sandy soil surface and, more particularly, to a rake for use in sand traps, or bunkers, on golf courses.

BACKGROUND

Sand traps, or bunkers, are a common form of hazard or obstacle on golf courses and are used to make the game more challenging by increasing the difficulty of play. Golf etiquette mandates that players repair the surface of a sand trap after having landed in and removing a ball from the sand trap, either by attempting to hit out of the sand trap or by taking a stroke penalty. Conventional rakes that have been used to repair the surface of sand traps do not adequately and efficiently restore a smooth surface to the sand which should be left free from furrows, ridges, or other formations in the sand. For example, the use of conventional garden-type rakes is generally unsatisfactory because such rakes leave furrows where the tines have been pulled or pushed through the sand. Moreover, such conventional garden-type rakes are susceptible to causing the accumulation of piled sand at the ends of a push or pull stroke. Various solutions have been proposed to address these problems, but the proposed rakes have generally required a user to turn the rake over and engage the sand surface with an alternative structure. Accordingly, these proposed rakes require additional steps and several passes over the same surface in an attempt to obtain a smooth surface. A need therefore exists for an improved sand trap rake that overcomes these and other drawbacks of tools heretofore proposed to treat the surface of a sand trap or bunker.

SUMMARY

The present invention provides a sand trap rake that facilitates efficient repair of a sand surface and provides a smooth surface that is free from furrows, ridges, and piles. In one aspect, the rake may be used in both pushing and pulling motions to repair the sand surface, and does not require users to turn the rake head over. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present invention, a sand trap rake for use on golf courses includes an elongate rake head having an elongate body member with a front end, a back end, and first and second lateral sides between the front and back ends. The rake head defines a raking direction aligned with a direction extending from the front end to the back end. A plurality of tines extend downwardly from the body member and are spaced apart along a longitudinal direction of the rake head, transverse to the raking direction. The rake further includes an elongate front blade extending downwardly from the front end of the body member, and an elongate rear blade extending downwardly from the back end of the body member.

In another aspect, the rake head further includes a socket adapted to receive a rake handle. The socket may be configured such that a longitudinal axis of a rake handle received in the socket is aligned relative to the front and rear blades such that the rake head is operable in one of four raking modes. In another aspect, the raking modes are selectable based on an angle that a longitudinal axis of the rake handle makes with a horizontal direction, together with a movement of the rake head along the raking direction.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

FIG. 4 is a left-side elevation view of the rake head of FIG. 1, the right-side elevation view being a mirror image thereof.

FIG. 5 is a top plan view of the rake head of FIG. 1.

FIG. 6 is a bottom view of the rake head of FIG. 1.

DETAILED DESCRIPTION

Figure 1:
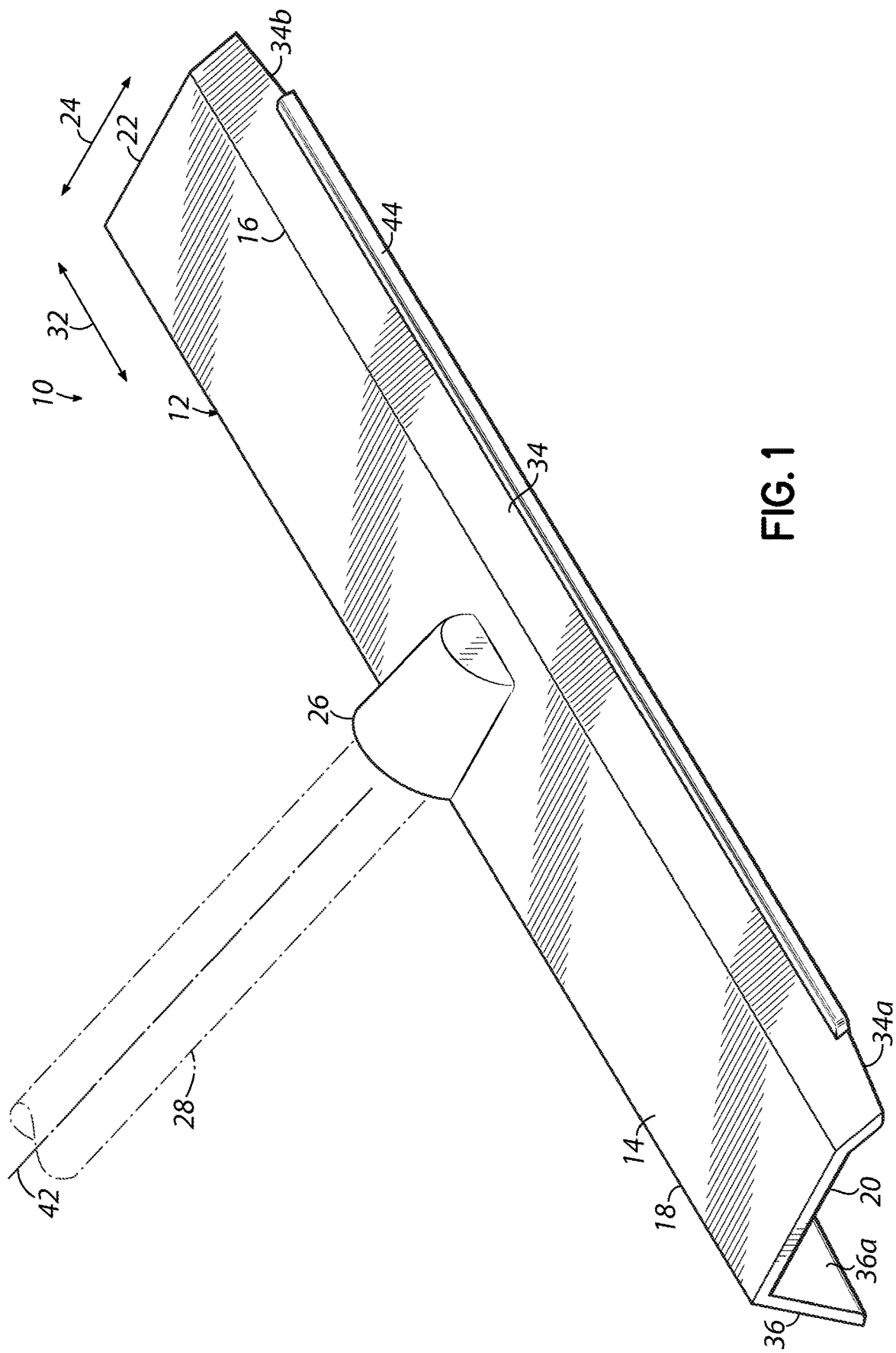
FIG. 1 is a partial front perspective view of an exemplary sand trap rake in accordance with the principals of the present disclosure.
Figure 2:
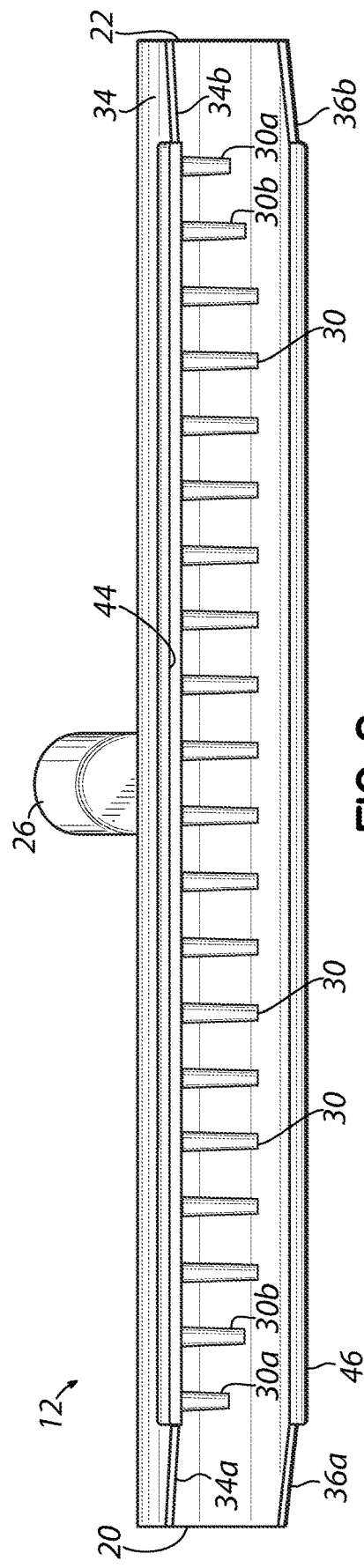
FIG. 2 is a front elevation view of a rake head of the rake of FIG. 1.
Figure 3:
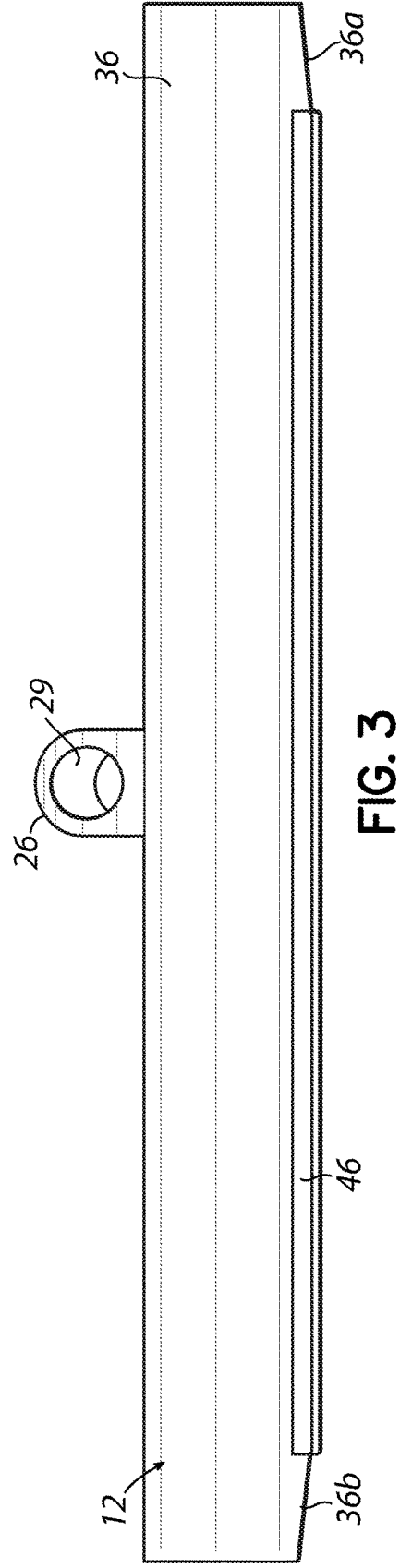
FIG. 3 is a rear elevation view of the rake head of FIG. 1.

FIGS. 1-7 depict an exemplary embodiment of a sand trap rake 10 in accordance with the principals of the present disclosure. With particular reference to FIGS. 1-3, the sand trap rake 10 includes a generally elongate rake head 12 including an elongate body member 14 having a front end 16, a back end 18 opposite the front end 16, and first and second lateral sides 20, 22 disposed between the front and back ends 16, 18. The rake head 12 defines a raking direction 24 that is aligned with a direction that extends from the front end 16 to the back end 18 of the body member 14. A socket 26 may be provided on the rake head 12 for receiving a rake handle 28, such as through a threaded aperture 29, for example. In the embodiment shown, the socket 26 is disposed on the body member 14, however, it will be appreciated that a socket may be provided on other suitable portions of the rake head 12 as may be desired. Alternatively, various other methods of attaching a handle 28 to the rake head 12 may be used.

A plurality of tines 30 extend downwardly from the elongate body member 14, in a direction generally opposite the socket 26. As best seen in FIGS. 2 and 6, the plurality of tines 30 are spaced apart from one another along a longitudinal direction 32 of the rake head 12, transverse to the raking direction 24. The rake head 12 further includes an elongate front blade 34 extending downwardly from the front end 16 of the body member 14, and an elongate rear blade 36 extending downwardly from the back end 18 of body member 14, as best seen in FIGS. 1 and 4. In the embodiment shown, the body member 14 is in the form of a generally planar top wall, and a generally planar front blade 34 extends forwardly and downwardly from the front end 16 of the top wall. The rear blade 36 may also be generally planar in shape, and extends rearwardly and downwardly from the back end 18 of the top wall.

In the embodiment shown, a distal free edge 38 of the front blade 34 may be positioned a vertical height H1 above the distal ends of the plurality of tines 30 when the longitudinal axes of the tines 30 are aligned with a vertical direction, as depicted in FIG. 4. A distal free edge 40 of the rear blade 36 may be positioned at a vertical height H2 below the distal ends of the tines 30 when the longitudinal axes of the tines 30 are aligned with the vertical direction, as depicted in FIG. 4. In this embodiment, the socket 26 may be configured such that a longitudinal axis 42 of a rake handle 28 received in the socket 26 may be aligned relative to the front and rear blades 34, 36 such that the rake head 12 may be selectively operable in one of four different raking modes. The desired raking mode may be selected by a user based on positioning the longitudinal axis 42 of the rake handle 28 at different angles with respect to a horizontal direction and depending upon movement of the rake head 12 along the raking direction 24 in either a pulling or pushing motion.

While the embodiment depicted in FIG. 4 has a rear blade 36 with a distal free edge 40 that is positioned at a vertical height H2 below the distal ends of the tines 30, in another embodiment, the distal free edge 40 of the rear blade 36 may be positioned at the same vertical height as the distal ends of the tines 30 when the longitudinal axes of the tines 30 are aligned with the vertical direction. In yet another embodiment, the distal free edge 40 of the rear blade 36 may be positioned at a vertical height in a range of heights that is the same as or below the distal ends of the tines 30 when the longitudinal axes of the tines 30 are aligned with the vertical direction.

Figure 7:
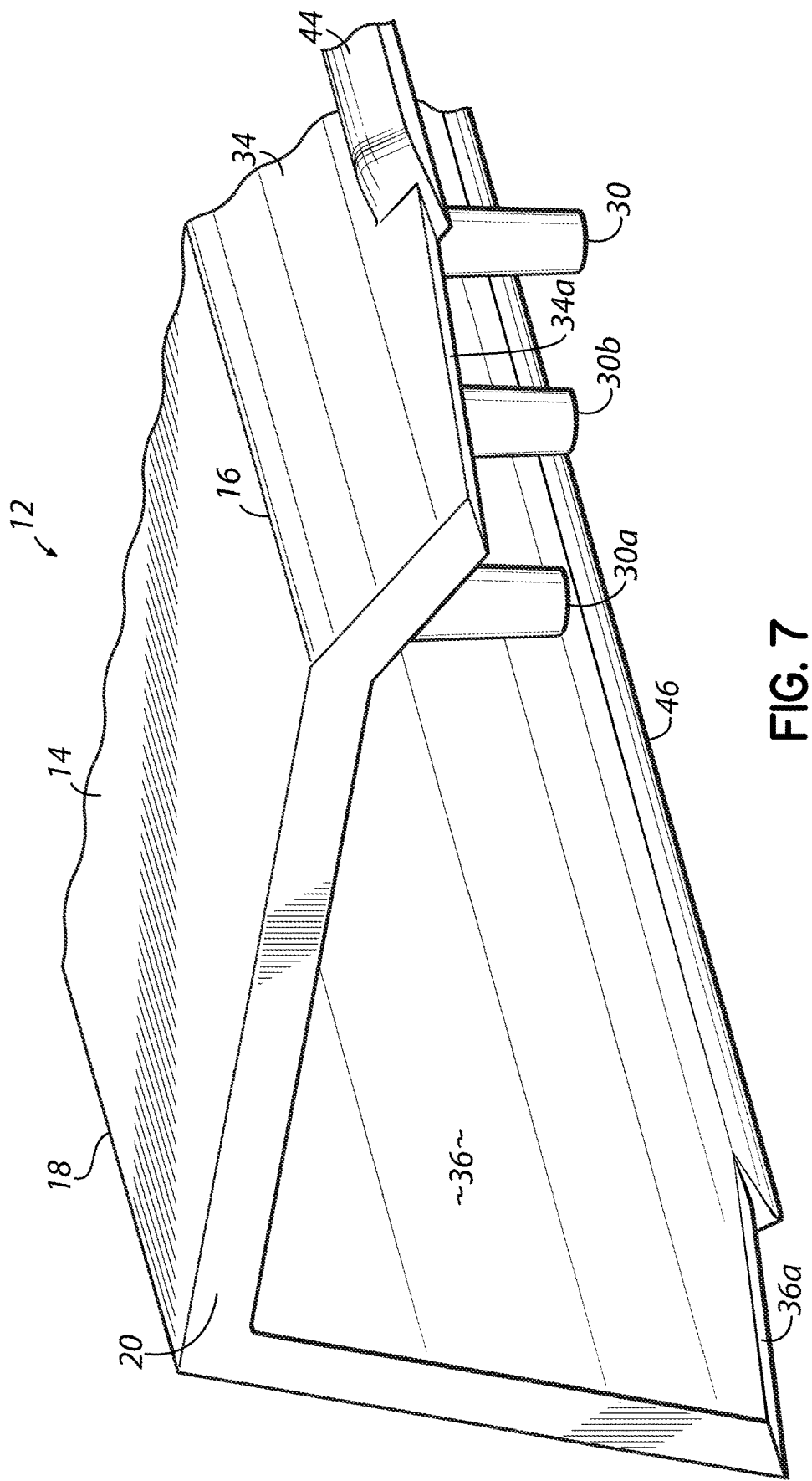
FIG. 7 is a partial perspective view of the rake head of FIG. 1.

With continued reference to FIG. 1, and referring further to FIGS. 2 and 3, portions 34*a*, 34*b* of the distal free edge 38 of the front blade 34 adjacent the first and second lateral sides 20, 22 of the body member 14 may be angled in a direction toward the front end 16 of the body member 14. In another aspect, portions 36*a*, 36*b* of the distal free edge 40 of the rear blade 36 adjacent the first and second lateral sides 20, 22 may be angled in a direction toward the back end 18 of the body member 14 as best seen in FIGS. 2, 3, and 7. The angled portions 34*a*, 34*b*, 36*a*, 36*b* of the front and/or rear blades 34, 36 help to reduce or eliminate the formation of furrows or ridges near the lateral sides 20, 22 of the rake head 12 as the rake head 12 is pushed or pulled through the sand.

The exemplary sand trap rake 10 may further include an elongate front lip 44 provided on the distal free edge 38 of the front blade 34. As best seen in FIGS. 1, 4, and 7, the front lip 44 extends outwardly from the front blade 34. In the embodiment shown, the longitudinal length of the front lip 44 is less than the overall length of the front blade 34, and generally terminates at the points where the portions 34*a*, 34*b* of the front blade 34 are angled in a direction toward the front end 16 of the body member 14. The exemplary rake head 12 may further include a rear lip 46 disposed on the distal free edge 40 of the rear blade 36, and extending outwardly from the rear blade 36 as depicted in FIGS. 4 and 7. In the embodiment shown, the longitudinal length of the rear lip 46 is less than the overall length of the rear blade 36 and generally terminates at the points where the portions 36*a*, 36*b* of the rear blade 36 are angled in a direction toward the back end 18 of the body member 14. Advantageously, the front and/or rear lips 44, 46 increase the area of contact of the front and rear blades 34, 36 with the sand surface to enable the front and rear blades 34, 36 to ride atop the sand surface as the rake head 12 is moved along a raking direction 24. Alternatively, the distal edges 38, 40 of the front and rear blades 34, 36 may be constructed in a wider configuration extending outwardly, to enable the front and rear blades 34, 36 to ride atop the sand surface as the rake head 12 is moved along a raking direction 24.

With particular reference to FIGS. 2, 4, 6, and 7, the plurality of tines 30 of the embodiment shown are aligned along the longitudinal direction 32 of the rake head 12, and are generally parallel to one another. The tines 30 may have a generally cylindrical shape, and may taper along their axial lengths in a direction away from the body member 14 of the rake head 12. In the embodiment shown, the tines 30 are also spaced a distance D from the lateral sides 20, 22 of the rake head, such that no tines are provided proximate the sides of the front and rear blades 34, 36, where the end portions 34*a*, 34*b*, 36*a*, 36*b* are angled toward the front and rear ends 16, 18 as described above (see FIG. 6). Advantageously, the absence of tines 30 and the angled arrangement of the end portions 34*a*, 34*b*, 36*a*, 36*b* near the lateral sides 20, 22 of the rake head 12 cooperate to reduce or eliminate the formation of furrows or ridges near the lateral sides 20, 22 of the rake head 12 as the rake head 12 is pulled or pushed through the sand.

While the plurality of tines 30 in the embodiment shown and described herein are arranged in a single row aligned along the horizontal direction 32, it will be appreciated that a rake head in accordance with the principles of the present disclosure may alternatively include more than one row of tines. In some embodiments, at least some of the plurality of tines 30 with generally cylindrical shapes may have different lengths or dimensions. In other embodiments, tines of a rake head in accordance with the principles of the present disclosure may be shaped as generally planar bodies, or at least some of the tines may have a tapered shape and may be oriented in one or more parallel rows.

In some embodiments, one or more tines that are located closest to the first and second laterals sides 20, 22 of the body member 14 may have reduced lengths compared to tines 30 disposed near the center of the body member 14. In the embodiment shown, tines located closest to the first and second lateral sides 20, 22 may have successively diminishing lengths. With reference to FIGS. 2 and 7, the tines 30*a* that are located closest to the first and second lateral sides 20, 22 have a reduced length compared to tines 30 that are spaced further from the first and second lateral sides 20, 22. Tines 30*b* that are located immediately adjacent tines 30*a* have lengths intermediate the lengths of tines 30*a* and tines 30. Advantageously, the diminished lengths of the tines 30*a*, 30*b* located near the first and second lateral sides 20, 22 help to reduce or eliminate the formation of furrows or ridges near the lateral sides 20, 22 of the rake head 12 as the rake head 12 is pushed or pulled through the sand.

FIGS. 8A-8D illustrate use of the exemplary sand trap rake 10 to prepare a sand surface 50, such as a sand trap, or bunker, of a golf course. Advantageously, the rake 10 can be operated in four distinct raking modes that can be selected by a user based on an angle between the longitudinal axis 42 of the rake handle 28 and the horizontal direction 52, and also based on whether the user is pushing or pulling the rake head 12 along the raking direction 24. With reference to FIG.

Figure 8A:
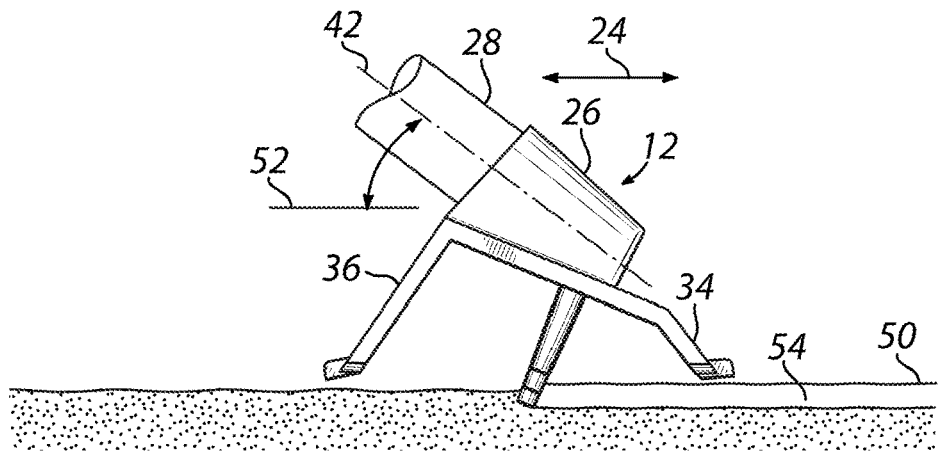
FIGS. 8A-8D illustrate use of the rake of FIG. 1 in a plurality of raking modes.
Figure 8B:
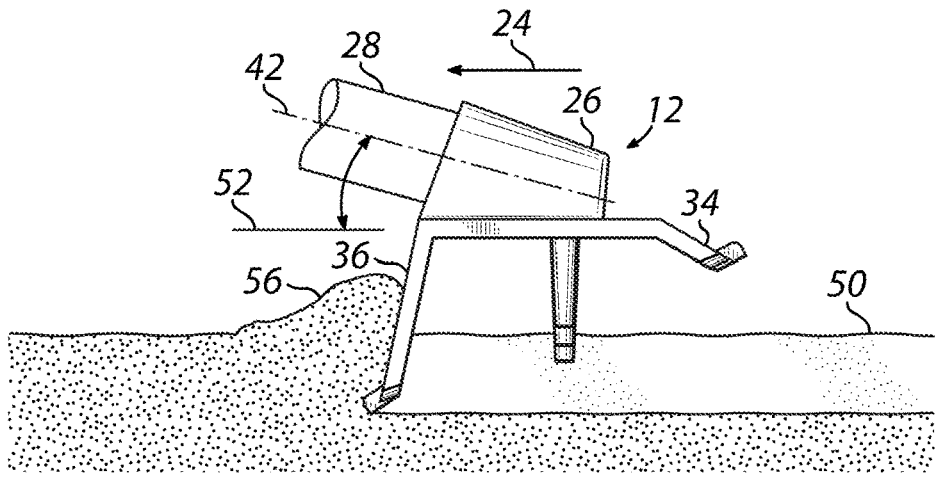

8A, use of the rake 10 in a first raking mode is depicted, wherein the handle 28 is held by the user at an angle relative to horizontal 52 such that the front and rear blades 34, 36 are positioned above the sand surface 50 and the tines 30 are caused to move through the sand in a conventional manner as the user pushes or pulls the rake head 12 along the raking direction 24, thereby leaving behind distinct furrows 54 in the sand surface 50. With reference to FIG. 8B, use of the rake 10 in a second raking mode is shown, wherein the handle 28 is disposed at an angle relative to horizontal 52 such that the rear blade 36 fully engages the sand surface 50 and moves larger volumes of sand 56 as the user pulls the rake head 12 along the raking direction 24. Use of the exemplary rake 10 in the second raking mode is useful for grading roughly disturbed sand surfaces.

Figure 8C:
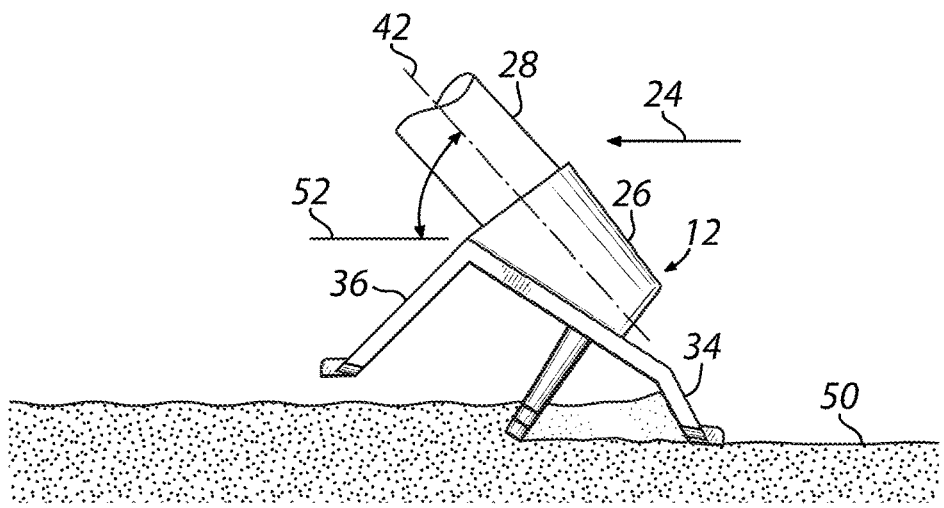
Figure 8D:
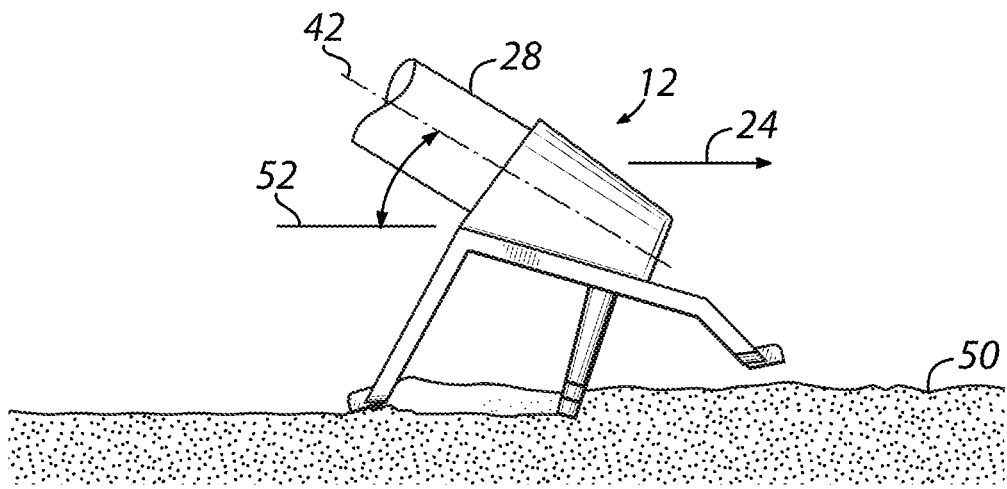

Referring to FIG. 8C, use of the rake in a third raking mode is depicted, wherein the handle 28 is disposed at an angle relative to horizontal 52 such that the front blade 34 engages the sand surface 50 and smooths out furrows created by action of the tines 30 moving through the sand as the user pulls the rake head 12 along the raking direction 24, leaving the sand surface 50 in a smooth and firm condition. In FIG. 8D, use of the exemplary rake 10 in a fourth raking mode is illustrated. In the fourth mode, the user holds the rake handle 28 relative to the horizontal direction 52 such that the rear blade 36 engages the sand surface 50 and smooths out furrows created by action of the tines 30 moving through the sand as the user pushes the rake head 12 through the sand along the raking direction 24, leaving the sand surface 50 in a smooth and firm condition. Accordingly, by varying the angle of the handle 28 relative to horizontal 52 while pushing or pulling the rake head 12 along the raking direction 24, a user can readily switch between raking modes thereby allowing the user to quickly and efficiently prepare a sand surface 50 for play.

In one embodiment, a rake head 12 as shown and described herein may be formed from suitable polymeric material, such as by various molding techniques. It will be appreciated, however, that various other materials and methods of manufacture may be employed to make a rake head 12 in accordance with the principles of the present disclosure, such as by casting, machining, or stamping, for example. Moreover, it will be appreciated that a rake head 12 in accordance with the principles of the present disclosure may be formed as a one-piece, unitary structure, or it may be formed as two or more components that are assembled together.

Figure 9:
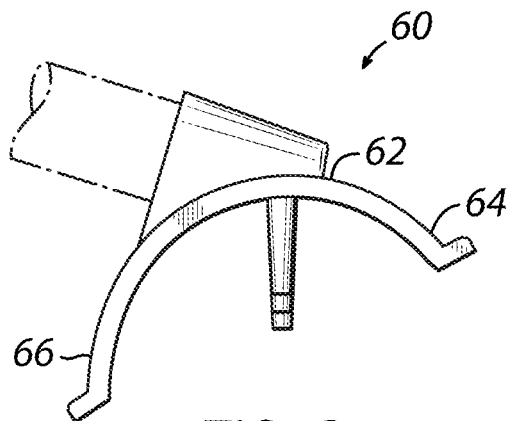
FIG. 9 is a schematic cross-section view illustrating a second exemplary rake head in accordance with the principals of the present disclosure.
Figure 10:
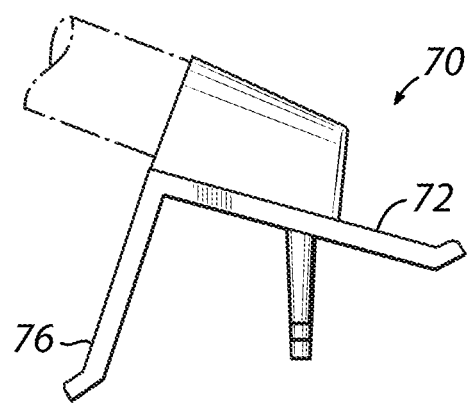
FIG. 10 is a schematic cross-section view illustrating a third exemplary rake head in accordance with the principals of the present disclosure.

While the exemplary embodiment is shown and described herein as having a rake head 12 with a generally planar top wall 14, and generally planar front and rear blades 34, 36, it will be appreciated that a rake head in accordance with the present disclosure may be formed in various other ways to define a front blade and a rear blade positioned forwardly and rearwardly, respectively, of a plurality of tines, and which are configured to reduce or eliminate furrows created by movement of the tines through a sand surface during raking. FIGS. 9 and 10 illustrate non-limiting examples of various other configurations of exemplary rake heads 60, 70 in accordance with the principles of the present disclosure. FIG. 9 illustrates an exemplary embodiment of a rake head 60 having a generally arcuate cross-sectional shape wherein a central portion 62 of the arc shape serves as the body member, and the end portions 64, 66 of the arc shape serve as the front and rear blades, respectively. FIG. 10 illustrates another exemplary embodiment of a rake head 70 having a generally L-shaped cross section wherein one leg 72 of the L-shape may function as the body member supporting the tines 74, and also functions as the front blade. The other leg 76 of the L-shape functions as the rear blade. In yet another alternative embodiment, similar to FIG. 10, one leg of an L-shaped cross section could function as the body member and the rear blade, while the other leg functions as the front blade. The exemplary rake heads 60, 70 may have various other features similar to those described above with respect to rake head 12 depicted in FIGS. 1-7, and may be operable in selectable raking modes as described with respect to FIGS. 8A-8D.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A sand trap rake for use on golf courses, the rake comprising:
    an elongate rake head including an elongate body member having a front end, a back end, and first and second lateral sides between the front and back ends, the rake head defining a raking direction aligned with a direction extending from the front end to the back end;
    a plurality of tines extending downwardly from the body member and spaced apart along a longitudinal direction of the rake head, transverse to the raking direction;
    an elongate front blade extending downwardly from the front end of the body member;
    an elongate rear blade extending downwardly from the back end of the body member;
    wherein the body member comprises a generally planar top wall of the rake head;
    wherein the front blade has a generally planar shape and extends forwardly and downwardly from the front end of the top wall; and
    wherein the rear blade has a generally planar shape and extends rearwardly and downwardly from the back end of the top wall.

2. A sand trap rake for use on golf courses, the rake comprising:
    an elongate rake head including an elongate body member having a front end, a back end, and first and second lateral sides between the front and back ends, the rake head defining a raking direction aligned with a direction extending from the front end to the back end;
    a plurality of tines extending downwardly from the body member and spaced apart along a longitudinal direction of the rake head, transverse to the raking direction;
    an elongate front blade extending downwardly from the front end of the body member;
    an elongate rear blade extending downwardly from the back end of the body member;
    a distal free edge of the front blade is positioned at a vertical height above the distal ends of the tines when the longitudinal axes of the tines are aligned with the vertical direction; and
    a distal free edge of the rear blade is positioned at a vertical height that is the same as or below the distal ends of the tines when the longitudinal axes of the tines are aligned with the vertical direction.

3. The rake of claim 2, further comprising an elongate front lip on a distal free edge of the front blade and extending outwardly from the front blade.

4. The rake of claim 3, wherein a longitudinal length of the front lip is less than the length of the front blade.

5. The rake of claim 2, further comprising an elongate rear lip on a distal free edge of the rear blade and extending outwardly from the rear blade.

6. The rake of claim 5, wherein a longitudinal length of the rear lip is less than the length of the rear blade.

7. The rake of claim 2, wherein a distal free edge of the front blade, adjacent the first and second lateral sides of the body member, is angled in a direction toward the front end of the body member.

8. The rake of claim 2, wherein a distal free edge of the rear blade, adjacent the first and second lateral sides of the body member, are angled in a direction toward the back end of the body member.

9. The rake of claim 2, further comprising a rake handle operatively coupled with the rake head.

10. The rake of claim 9, wherein the rake head further comprises a socket adapted to receive the rake handle.

11. The rake of claim 9, wherein the handle is coupled with the rake head such that a longitudinal axis of the handle is aligned relative to the front and rear blades such that the rake head is operable in one of four raking modes, the raking modes selectable based on an angle of the longitudinal axis of the rake handle with a horizontal direction in cooperation with a movement of the rake head along the raking direction.

12. The rake of claim 11, wherein:
a first raking mode is selected by pulling or pushing the rake head with the handle disposed at an angle relative to horizontal such that the front and rear blades are positioned above the sand surface and the tines create furrows in the sand surface;
a second raking mode is selected by pulling the rake head with the handle disposed at an angle relative to horizontal such that the rear blade engages the sand surface and pushes sand to grade the surface;
a third raking mode is selected by pulling the rake head with the handle disposed at an angle relative to horizontal such that the front blade engages the sand surface and smooths out furrows created by action of the tines moving through the sand; and
a fourth raking mode is selected by pushing the rake head with the handle disposed at an angle relative to horizontal such that the rear blade engages the sand surface and smooths out furrows created by action of the tines moving through the sand.

13. The rake of claim 2, wherein the tines located adjacent the first and second lateral sides are spaced a distance from the first and second lateral sides that is at least as great as a length of the respective tine.

14. The rake of claim 2, wherein longitudinal axes of the tines are parallel, and at least one tine located adjacent each of the first and second lateral sides has a length that is less than the lengths of tines located near the longitudinal center of the rake head.

15. A method of preparing a sand surface for golf play, the method comprising:
engaging the sand surface with a sand trap rake, the sand trap rake comprising a rake according to claim 8; and
at least one of pushing or pulling the rake head along the sand surface in the raking direction.

16. The method of claim 15, wherein at least one of pushing or pulling the rake head along the sand surface comprises at least one of:
manipulating the rake in a first raking mode by pulling or pushing the rake head with the handle disposed at an angle relative to horizontal such that the front and rear blades are positioned above the sand surface and the tines create furrows in the sand surface;
manipulating the rake in a second raking mode by pulling the rake head with the handle disposed at an angle relative to horizontal such that the rear blade engages the sand surface and pushes sand to grade the surface;
manipulating the rake in a third raking mode by pulling the rake head with the handle disposed at an angle relative to horizontal such that the front blade engages the sand surface and smooths out furrows created by action of the tines moving through the sand; or
manipulating the rake in a fourth raking mode by pushing the rake head with the handle disposed at an angle relative to horizontal such that the rear blade engages the sand surface and smooths out furrows created by action of the tines moving through the sand.

\* \* \* \* \*